Patented Apr. 7, 1942

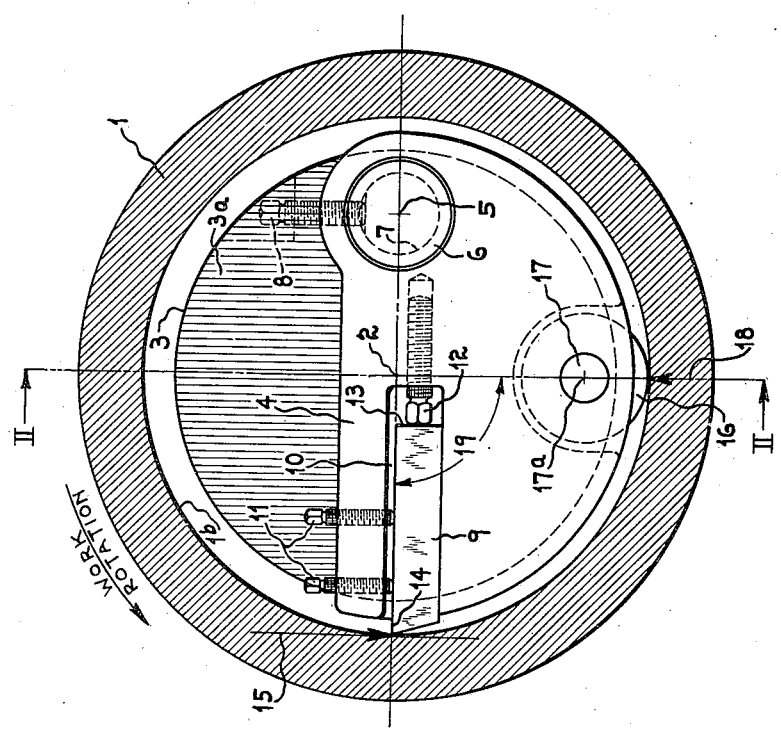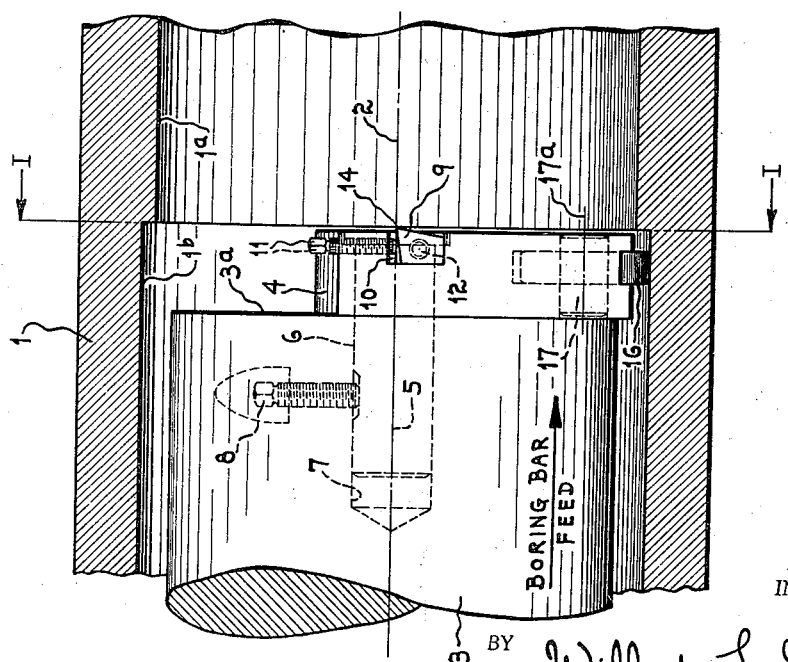

2,278,988

UNITED STATES PATENT OFFICE 2,278,988

BORING TOOL HOLDER

Willard L. Groene, Cincinnati, Ohio, assignor to The R. K. Le Blond Machine Tool Company, Cincinnati, Ohio, a corporation of Delaware Application July 24, 1940, Serial No. 347,338

8 Claims. (Cl. 77—58)

This invention pertains to a boring tool holder arrangement which is floatingly mounted on a boring bar for use in boring tubes or gun barrels in lathes of a type, for example, as shown in Patent #1,363,506, in which the tubular work piece is chucked and rotated while the boring bar carrying the unique floating boring tool is moved through the bore of the work longitudinally of the axis of rotation of the lathe.

It has long difficult to rapidly bore relatively long tubes and gun barrels because of the necessity of the relatively large amount of overhang required of the boring bar to pass through the work which would cause it to spring out of true position relative to the axis of the lathe, particularly when it was attempted to do heavy cutting. Thus it has been necessary in the past to take relatively light cuts to first get a true and smooth bore so that later a packed bit may be used which is guided in this smooth bore. The inadequacy of this former method lies in the great time consuming slow operations of preparing the initial smooth bore and the great difficulty of getting this bore sufficiently accurate and concentric to carry the usual packed bit.

An object of this invention is to provide a boring tool holder which is floatingly mounted on a boring bar for movement perpendicular to the axis of rotation of the lathe and adapted to be fed longitudinally of said axis of the tubular member being bored in the lathe.

Another object of this invention is to provide a tool holder which is pivotally mounted on a boring bar having a cutting tool adapted to engage and machine the inside bore of a work piece in such a way that the cutting action of the work against the tool is transmitted to the bore of said work piece at a position substantially 90° circumferentially removed from the point at which the cutting tool is operating on said bore of said work piece.

Another feature of this invention is the provision of a boring tool on a boring bar floatingly mounted so that its cutting edge may float in a direction substantially tangent to the surface of the work being bored and to limit this floating movement by engagement of the tool holder with the bore of said work piece.

A still further object of this invention is to provide a floatingly mounted boring tool holder which is mounted on a pivot fixed on said boring bar and which has a cutting tool also mounted in said tool holder adapted to engage the bore of the work piece to be machined and to provide a work surface engaging portion on said tool holder located at a point 90° circumferentially removed from the point of contact of said cutting tool with the bore of said work piece and positioned in a plane perpendicular to a plane passing through the pivot and the cutting edge of said tool and lying intermediate thereof.

Further features and advantages of this invention will appear from the detailed description of the drawing in which:

Figure I is a transverse section on the line I—I of Figure II showing the end view of a boring bar, with the unique floatingly mounted boring tool holder mounted thereon, operating upon the bore of a work piece being rotated in a lathe of a character, for example, as set forth in Patent #1,363,506.

Figure II is a longitudinal section on the line II—II of Figure I, showing the side view of the boring bar, the floating boring tool holder arrangement, and its relationship to the bore of the work piece being machined.

In the drawing is shown a typical tubular work piece 1, which is chucked and rotated in a lathe of a character shown, for example, in Patent #1,363,506, so that it rotates counterclockwise as shown in Figure I, about the axis of rotation 2 of the lathe. The work piece 1 has a rough bore 1a, which is to be machined down to the bore 1b by longitudinally feeding the boring bar 3 to the right as shown in Figure II.

On the end of this boring bar 3 is mounted the tool holder 4 which is pivotally mounted about the axis 5 of a suitable pin 6 which is securely fixed in the bore 7 in the boring bar 3 by an appropriate locking set screw 8. This tool holder 4 is thus held in nice sliding floating engagement with the surface 3a of the boring bar and carries a suitable cutting tool 9 fixed in an appropriate slot 10, in the tool holder by the set screws 11 and also supported in proper position by the back up screw 12 also mounted in the tool holder 4 and projecting into the slot 10 against the rear portion 13 of the tool.

The downward thrust on the cutting tool 9 caused by the rotation of the work against its cutting edge 14, as indicated by the arrow 15, causes the tool holder 4 to swing about the pivot 5. However, this motion is completely absorbed by the work engaging roller 16 suitably journaled on a pin 17 in the tool holder 4, which engages the bore 1b of the work 1 so that the work acts as an opposite and opposing force, as shown by the arrow 18, to oppose the effect of the force indicated by the arrow 15.

Thus the cutting edge 14 of the cutting tool 9 is arranged to float in the direction defined by the line 15, Figure I, limited by engagement of the roller 16 with the bore 1b, along the tangential line 15 relative to the work bore being machined in the work piece 1. It will be noted that the pivot axis 5 and the cutting edge 14 of the tool 9 lies in a plane passing through the axis of rotation 2 of the lathe and work piece 1 and it will also be noted that the axis 17a of rotation of the work engaging roller 16, lies in a plane, indicated by the line II—II, which is substantially perpendicular to the plane passing through the axis 5 and cutting edge 14 of the tool 9, as indicated by the angle 19, which is substantially a right angle. And it will also be noted that this plane defined by the line II—II, passes intermediate the axis 5 and the cutting edge of the tool 9, to affect the proper relationship of the sidewise radial thrust absorbing roller 16 in relation to the cutting action developed against the tool 14 by rotation of the work 1.

It is important to note that the work surface 1b need not be initially smooth or concentric with the axis of rotation 2 of the lathe to affect the proper ultimate finish and accuracy of the bore as machined by the cutting edge 14 of the tool. It is to be further noted that in the particular illustration of Figure II, the roller 16 is in contact with the finish machined surface 1b. This, however, is not essential to the satisfactory operation of this device and it is equally adapted to having its roller 16 operate in engagement with the rough or eccentric bore 1a of the work piece 1.

The reason why it is immaterial whether or not the bore engaged by the roller 16 is concentric or smooth, lies in the unique arrangement and relative position of the pivot point 5, the cutting edge 14 and the tool 9 and the axis 17a of the roller 16. Noting particularly Figure I, it can be seen that any irregularities which would cause the roller 16 to swing to or from the axis of rotation 2 of the lathe, will have substantially no effect whatever on the relationship of the cutting edge 14 of the tool relative to this axis 2 or the desired finished work surface 1b of the work piece 1.

Having thus fully set forth and described my invention, what I claim as new and desire to secure by United States Letters Patent is:

1. In a lathe, a tool carrier, a tool holder pivotally mounted on the said tool carrier, a cutting tool in said tool holder, said axis of pivoting of said tool holder and the cutting edge of said tool lying in a plane passing through the axis of rotation of said lathe, and means on said tool holder for engaging a work piece to be bored by the tool in said tool holder.

2. In a lathe, a tool carrier, a tool holder pivotally mounted on said tool carrier, a tool mounted on said tool holder adapted to engage a bore of a work piece to be bored in said lathe, said axis of pivoting and said cutting edge of said tool being positioned in a plane passing through the axis of rotation of said lathe and the work piece to be bored, and means on said tool holder for engaging the bore of said work piece.

3. In a lathe, a tool carrier, a tool holder pivotally mounted on said tool carrier, a tool mounted on said tool holder adapted to engage a bore of a work piece to be bored in said lathe, said axis of pivoting and said cutting edge of said tool being positioned in a plane passing through the axis of rotation of said lathe and the work piece to be bored, and means on said tool holder for engaging the bore of said work piece at a point substantially 90° circumferentially removed from the point of contact of the cutting edge of said cutting tool with the bore of said work piece.

4. In a lathe, a tool carrier, a tool holder pivotally mounted on said tool carrier, a tool mounted on said tool holder adapted to engage a bore of a work piece to be bored in said lathe, said axis of pivoting and said cutting edge of said tool being positioned in a plane passing through the axis of rotation of said lathe and the work piece to be bored, and means on said tool holder for engaging the bore of said work piece, said work engaging member comprising a roller journaled in said work holder, the axis of rotation of said roller lying in a plane perpendicular to said first mentioned plane and passing through the axis of rotation of said lathe and work piece.

5. In a tool feeding device, a boring bar, a cutting tool mounted on said boring bar with its cutting edge in engagement with a bore of a work piece to be machined so that its cutting edge has tangential floating movement relative to the surface being machined in said bore, and means for limiting said tangential floating movement of the cutting edge of said tool by engagement with said bore of said work piece.

6. In a lathe, a boring bar movable longitudinally of the axis of rotation of said lathe through a bore of a work piece rotatably mounted in said lathe, a tool holder floatingly mounted on the end of said boring bar, a tool in said tool holder having its cutting edge adapted to engage the bore of said work piece to be machined, means whereby said floatingly mounted tool holder affects tangential floating movement of the cutting edge of said cutting tool relative to the work bore being machined, and means whereby said tool holder engages the bore of said work piece to limit said tangential floating movement of the cutting edge of said cutting tool.

7. In a lathe, a tool carrier, a tool holder pivotally mounted on said tool carrier, a cutting tool in said tool holder, said axis of pivoting of said tool holder lying to one side and the cutting edge of said tool lying on the other side of the axis of rotation of said lathe in a plane passing through said axis, and means on said tool holder for engaging a work piece to be machined by the tool in said tool holder.

8. In a lathe, a tool carrier, a tool holder pivotally mounted on said tool carrier, a cutting tool in said tool holder, said axis of pivoting of said tool holder lying to one side and the cutting edge of said tool lying on the other side of the axis of rotation of said lathe in a plane passing through said axis, and means on said tool holder to contact said work piece at a point lying in a plane passing through said axis and perpendicular to said first mentioned plane to limit the pivotal motion of said tool holder.

WILLARD L. GROENE.